Oct. 3, 1944.  J. PATRICK  2,359,577
FOLDING HOUSE STRUCTURE
Filed Feb. 13, 1943  3 Sheets-Sheet 1
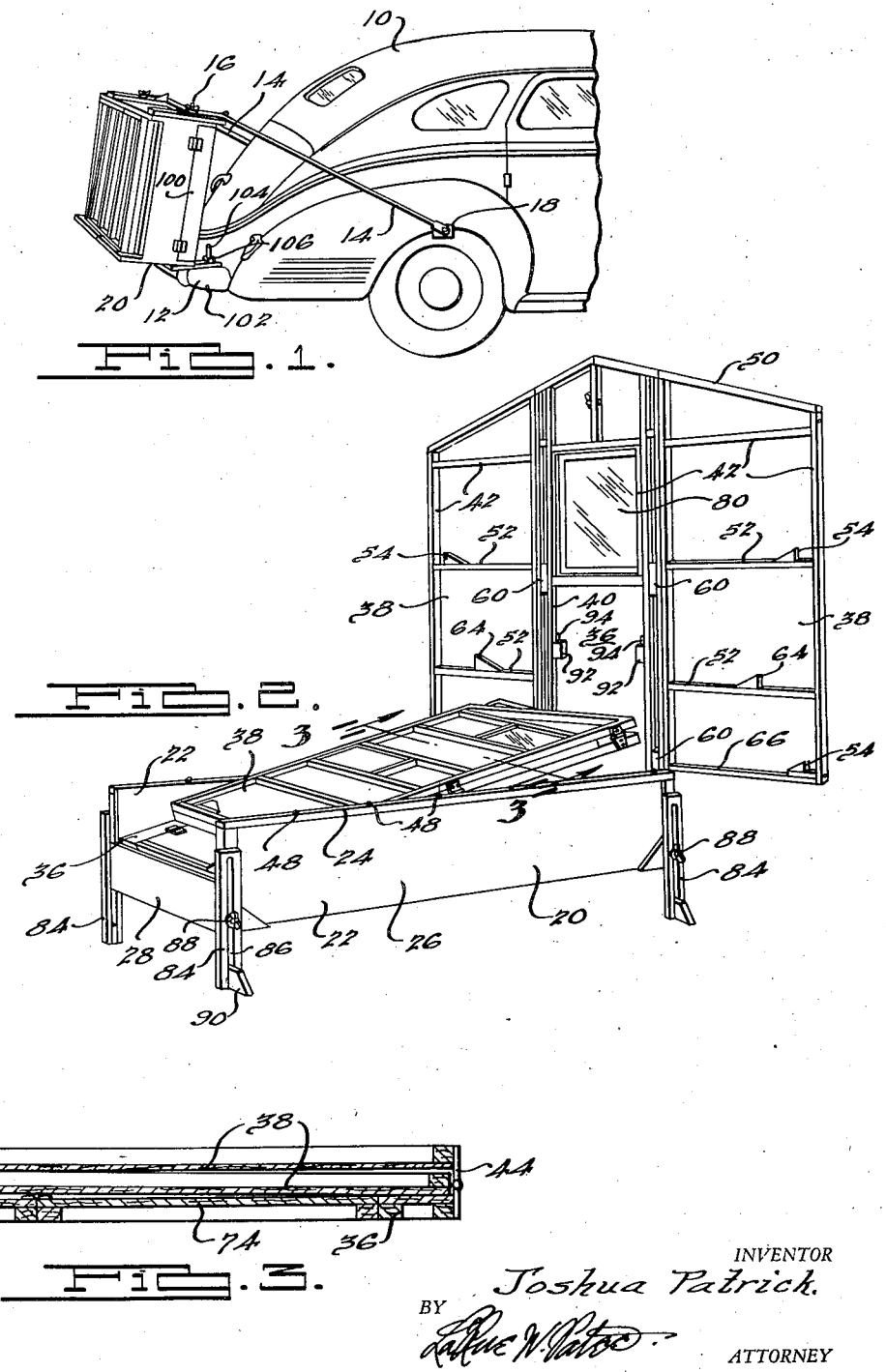
INVENTOR
Joshua Patrick.
BY
ATTORNEY Oct. 3, 1944. J. PATRICK 2,359,577
FOLDING HOUSE STRUCTURE
Filed Feb. 13, 1943 3 Sheets-Sheet 3
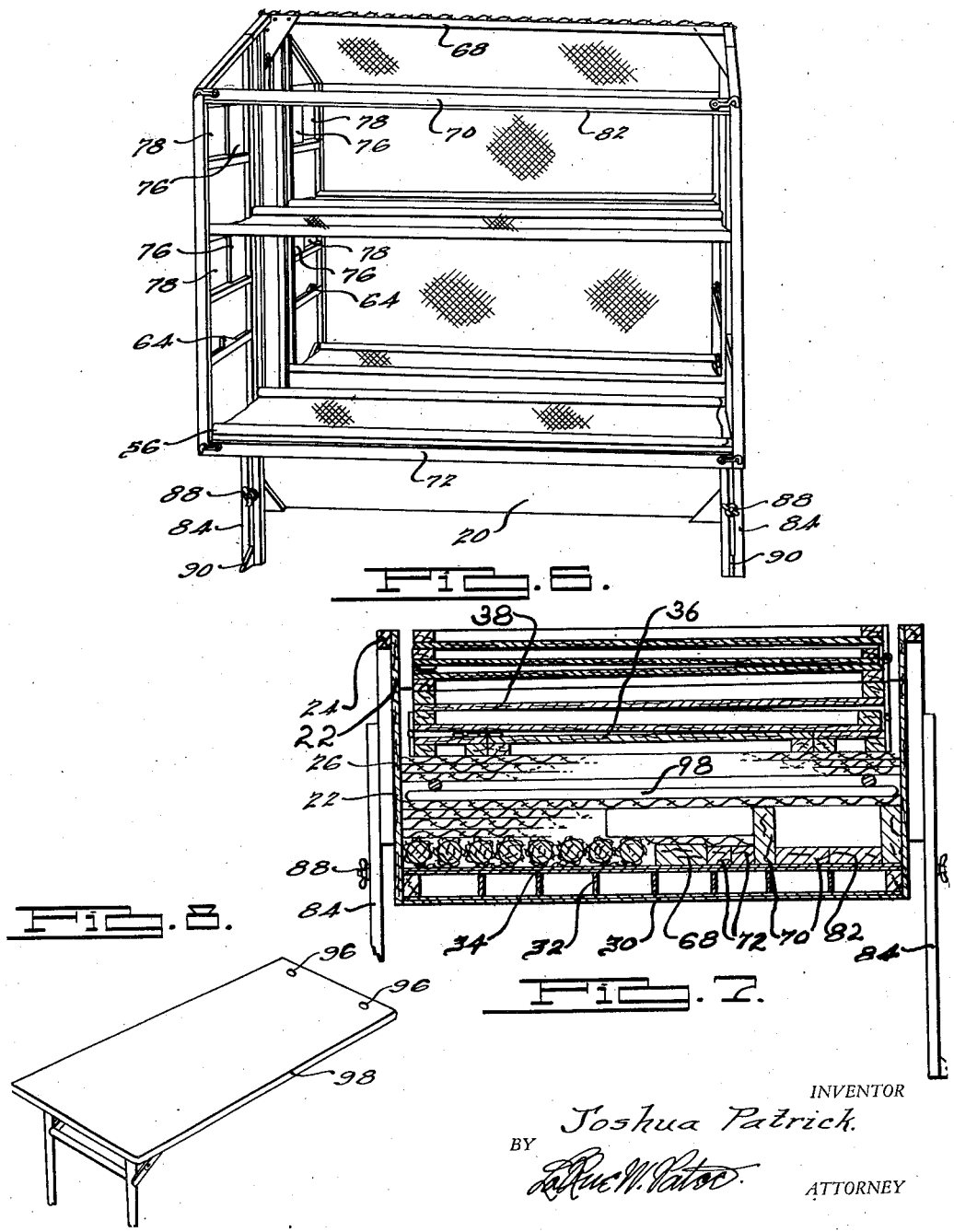
INVENTOR
Joshua Patrick.
BY
ATTORNEY Patented Oct. 3, 1944

2,359,577

UNITED STATES PATENT OFFICE 2,359,577

FOLDING HOUSE STRUCTURE

Joshua Patrick, Detroit, Mich.

Application February 13, 1943, Serial No. 475,703

4 Claims. (Cl. 20—2)

This invention relates to a house, and more particularly to a house of the collapsible type which may be conveniently folded into a compact unit for shipping, or storing when not in use.

An object of the invention is to provide a structure which is of the portable type; one which may be folded into a box-like unit for moving from one location to another and yet, when set up for use, capable of accommodating several individuals as a temporary house.

A further object of the invention is to provide a structure of the folding or collapsible type which is provided with a compartment for the storage of interior furnishings such as a table, stove, cots, and the like, when not in use.

Another object of the invention is to reduce the weight of a house structure by eliminating material which has heretofore been used to enclose unused space, such as, the flooring under cots, beds or the like.

Other objects and advantages of the invention will be more apparent from the following description taken in connection with the accompanying drawings, in which:

Fig. 1 is a perspective view of the rear portion of an automobile illustrating one way of convenient transportation of my improved structure, the collapsed house being shown as applied to the rear bumper of an automobile.

Fig. 2 is a perspective view of the house structure partially opened, one end wall being in opened position and the other end wall in a folded position.

Fig. 3 is a sectional view through the folded end wall on the lines 3—3 of Fig. 2.

Fig. 6 is a perspective view showing the interior of the house.

Fig. 7 is a transverse sectional view through the house in its folded position, showing the compartment for storage of the furnishings such as stove, canvas, cots and the like.

Fig. 8 is a perspective view illustrating a form of a collapsible table which may be conveniently used or stored.

Figure 4:
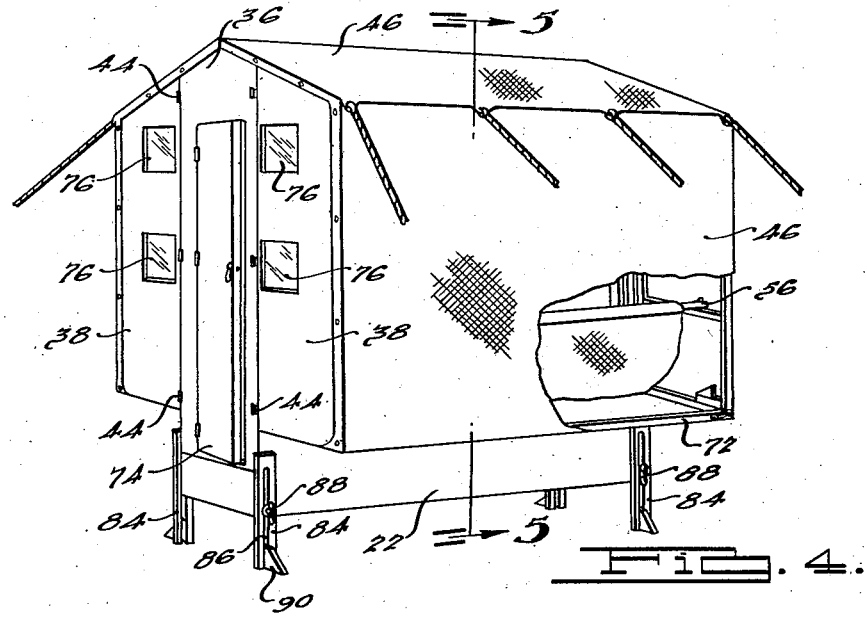
Fig. 4 is a perspective view of the house as assembled for use, parts being broken away, showing some of the interior.

Referring to the drawings, I have shown in Fig. 1 the rear portion of an automobile 10 having a bumper 12 supporting the house in its collapsed position. Braces 14 are detachably secured to the house as at 16 such as by bolts and are provided with clamps 18 which engage the edge of an automobile fender.

Referring to Fig. 2, the house comprises a narrow box portion 20 having two side walls 22 preferably made by a frame 24 to which is applied a plywood panel 26. The end walls 28 are of less heighth and are secured to the ends of the side walls. The floor of this box structure is of double thickness to give maximum strength for a minimum amount of material. Referring now to Fig. 7, the floor is preferably made of a thin plywood panel 30 forming the under section with transverse ribs 32, of ordinary building lath, and an upper section of thin plywood panel 34. These panel sections and ribs are secured together in the usual manner as by nails, screws or the like.

The end walls of the house are formed in three sections, a central panel 36 and side panels 38. The central panel 36 is of a width to fit within the side walls 22 and is hinged at its lower edge to the upper surface of the end walls 28. These panels are made having a frame 40 to which is attached a panel, preferably of plywood. The side panels are made of frames 42 having panels attached thereto and are hinged to the central panel as at 44 shown in Fig. 4.

The roof, side walls, and bottom of the house, with the exception of the floor shown by panels 30 and 34, are covered by a canvas strip 46. One edge of this canvas is secured to the upper edge of one side wall 22 by fasteners 48, the bottom edge of side panels 38, the vertical edges of panels 38, over the slanting edges 50, around the other side and secured to the upper edge of the opposite side wall 22. Thus I have provided a canvas floor for that portion of the house which is not walked upon and a rigid floor through the center. Since the sleeping compartments and seats are directly above the canvas floor there is no need of a rigid floor below that space, consequently I have reduced the weight and cost of the structure.

Figure 5:
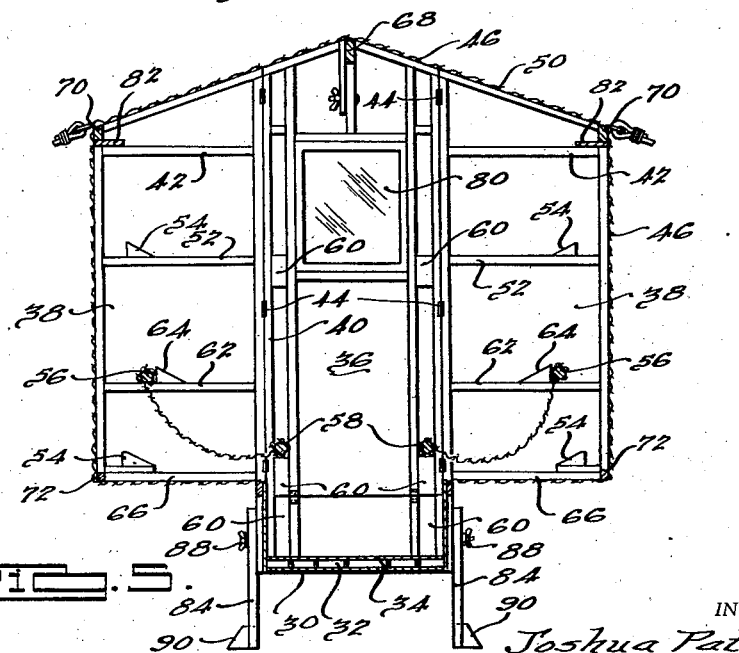
Fig. 5 is a sectional view taken on line 5—5 of Fig. 4.

The frame 42 of each side panel is provided with transverse ribs 52 upon which are secured stops 54. These position poles 56 to which are attached canvas forming a cot or seat. As shown in Fig. 5, the poles 56 are placed on a horizontal frame member 62 and positioned by stops 64 thus forming a seat rather than a bed. The poles 56 may be positioned on the lower transverse frame member 66 against the stops 54, thus forming a bed as illustrated in Fig. 6.

The opposite side of the cot, or poles 58, are positioned by blocks 60 which are arranged on the inside of the vertical frame member of the central panel 36. It will be noted that the poles 58 are positioned on the side of frames 40 such that the weight or strain on the cot will pull the central and outer panels together without strain on the hinges 44.

The end walls are spaced and secured in position by longitudinal bars, a central bar 68, upper side bars 70 and lower side bars 72. These are detachably secured by suitable hooks, dowels or bolts and when the house is collapsed they are carried in the box compartment with the cots, table and any other furnishings, as illustrated in Fig. 7.

One end of the house is provided with a door 74, hinged to the central panel 36. In this end I have provided windows 76 with movable shutters 78, one window for each of the four cots as illustrated. The opposite end wall is provided with a window 80.

To further strengthen and reinforce the upper longitudinal members 70, I have provided an attached shelf member 82 which also serves as a storage space for articles or a convenient means for hanging clothing.

Ropes or the like are attached to the upper edges of the side wall canvas and are secured to the ground to hold the house from tilting sidewise. This is desirable because of the narrow base and the overhanging upper portions.

Vertically adjustable legs 84 have slots 86 receiving bolts and nuts 88 which permit adjustment for any irregular location. A foot 90 has been provided to increase stability.

Blocks 92 are secured to the frame 40 at one end wall. These blocks 92 have pins 94 which are received in holes 96 in the table 98. The table is provided with a pair of folding legs at the opposite end from the holes.

Since the end walls are slightly higher than the floor, it is desirable to form a door 100, the opening for which is flush with the floor so that in cleaning, the dirt may be removed from the passage compartment flush with the floor. This door 100 also serves as a means for inserting the table, cot poles, canvas and longitudinal side bars in the storage compartment as illustrated in Fig. 7. Since the end walls 38, when folded are spaced from the upper surface of the floor, there is provided a storage compartment.

When the house is in folded position it can be placed on the automobile bumper with the legs 84 of one side resting on the upper edge of the bumper. A clamp 102 is hooked under the lower edge of the bumper and has a threaded end 104 which passes through the slot 86 in the leg 84. A nut 106 received on the threaded end securely holds the house in place. The bars 14 are then applied to hold the house from tilting.

When several units are to be transported, they can be stacked, one above the other, and shipped from one location to another. These compact units are ideal for army use, each unit accommodating four soldiers which can be set up or taken down quicker than a tent.

It will be understood that various changes, including the size, shape and arrangement of parts, may be made without departing from the spirit of my invention and it is not my intention to limit its scope other than by the terms of the appended claims.

I claim:

1. A folding house structure comprising a box having two side walls, two end walls and a floor, end panels hinged to the upper edge of said end walls, each end panel having side panels hinged thereto for extension beyond the side walls of said box, means for securing the extended panels at one end in upright spaced relation to the extended panels at the other and a fabric cover extending from the panels at one end to those at the other and supported by said securing means and secured to and supported by the edges of the panels at both ends and forming the roof, sidewalls and bottom portions of the house below said extended panels.

2. A folding house structure comprising a base portion in the form of an open box, an end panel hinged to one end of said box and being of a width and height to fit within the box, panels hinged to the longitudinal edges of said end panel substantially the width of said box but spaced at its lower end from the lower end of said end panel, a second end panel substantially similar to the first named end panel and hinged to the opposite end of said box, transverse frame members on said end panels, blocks on said transverse frame members for positioning the ends of cot poles extending longitudinally between said end panels, means for securing the extended panels at one end in upright spaced relation to the extended panels at the other and a fabric cover extending from the panels at one end to those at the other and supported by said securing means and secured to and supported by the edges of the panels at both ends and forming the roof, sidewalls and bottom portions of the house below said extended panels.

3. A folding house structure having a box base portion, a three-part end portion hinged to each end of said box adapted to be folded into said box, the lower edge of the two outer end portions terminating above the upper edge of the side walls of said box, means for securing the panels at each end in upright vertical relation with said three-part end portion folded in a vertical plane and a fabric cover extending from the panels at one end to the panels at the other and supported by said securing means and secured to and supported by the edges of the panels at both ends and forming the roof, sidewalls and bottom portions of the house below said extended panels.

4. A folding house structure having a base portion forming a compartment, end panels adapted to be received in said compartment and hinged to the opposite ends of said base for swinging into and out of said compartment, side extensions hinged to the vertical edges of said end panels with their lower edges spaced above the lower edge of said end panels, detachable spacers between the opposite upper and outer corners of said extended panels on said end panels when they are in a plane with said end panels and in a vertical position, and a cover of flexible material over the upper edges of said end panels and extended panels and over said spacers, said cover having its lower edges secured to said base and having its side edges secured to edges of said end panels and extended panels forming the roof, side walls, and bottom portion of said house beyond said base.

JOSHUA PATRICK.